UNITED STATES PATENT OFFICE 2,489,546

PRODUCTION OF 1-ALKYL-3-HYDROXY-PIPERIDINES

Serge Tchelitcheff, Vitry-sur-Seine, France, assignor to Societe des Usines Chimiques Rhone-Poulenc, Paris, France, a French body corporate No Drawing. Application June 26, 1946, Serial No. 679,587. In France March 24, 1944

Section 1, Public Law 690, August 8, 1946
Patent expires March 24, 1964

12 Claims. (Cl. 260—293)

This invention relates to a novel process for the production of certain industrial useful substituted piperidines; more specifically it concerns the preparation of N-alkyl-, N-aralkyl- and N-aryl-3-hydroxypiperidines, starting from hydrogenation products of furfural.

According to the present invention, it has now been found that these substituted piperidines may be prepared in a particularly convenient manner by reacting a hydrohalic acid, in particular hydrobromic acid, with an N-alkyl-, N-aralkyl- or N-aryl-tetrahydrofurfurylamine (the last-named products being themselves obtainable by the action of a halogen derivative of tetrahydrofurfural on a primary amine or by the catalytic hydrogenation of a mixture of furfural and a primary amine) in the proportion of two molecules of the hydrohalic acid to one of the N-substituted tetrahydrofurfurylamine and subsequently neutralising the hydrogen halide of the N-alkyl-, N-aralkyl- or N-aryl-1-amino-2-hydroxy-5-halogeno-pentane thus formed with an alkaline reagent, e. g. ammonia. The reaction is preferably effected in the presence of an organic acid such as acetic acid. Immediately on liberation, the halogenated amino-alcohol spontaneously cyclises, to give rise to an N-alkyl-, N-aralkyl- or N-aryl-3-hydroxy-piperidine which may then be isolated by the usual means.

The general course of the reactions involved in the foregoing process may be elucidated by the following equations which relate to a preferred embodiment of that process:

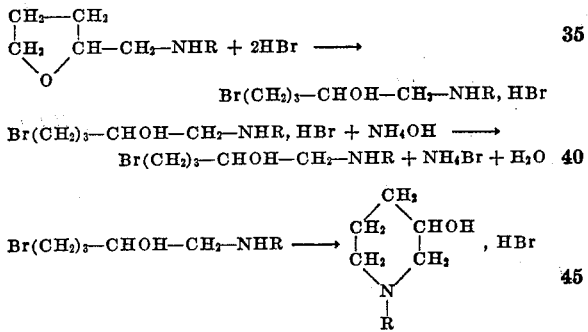

Without in any way limiting the invention, the following examples show how it may be put into actual practice:

Example I

A mixture of 11.5 g. of N-methyl-tetrahydrofurfurylamine (B. P. 40° C./9 mm.) and 8 g. of acetic acid are introduced into a round-bottomed flask fitted with a thermometer and a reflux condenser. While the temperature is maintained at 70°–90° C. a current of hydrobromic acid gas is passed into the mixture until 17 g. have been adsorbed, that is, after about an hour. The mixture is then kept for several hours at 100° C., whereafter it is cooled and treated with 10 ccs. of water.

25 ccs. of ammonia are then introduced dropwise into the solution thus obtained, keeping the temperature at about 0° C., and the liquid then saturated with dry caustic potash, when an oil separates out; this is decanted, dried and rectified. This gives a good yield of 3-hydroxy-1-methyl-piperidine as a colourless liquid, B. P. ca. 79° C./15 mm. (density at 16°=0.9635; refractive index $n_D^{16°}=1.4695$).

Example II

By using N-ethyl-tetrahydrofurfurylamine (B. P. 62° C./12 mm.) and proceeding as in Example I, 1-ethyl-3-hydroxy-piperidine is obtained.

Example III

Using N-propyl-tetrahydrofurfurylamine (B. P. 69° C./10 mm.) and proceeding as in Example I, an isoluble layer is seen to separate out, after the addition of the ammonia, consisting of 1-propylamino-3-hydroxy-5-bromopentane. Cyclisation of this product, which proceeds very rapidly, yields 1-propyl-3-hydroxy-piperidine, B. P. ca. 77° C./5 mm. (density at 15° C.=0.9712; refractive index $n_D^{15°}=1.4589$).

I claim:

1. A step in the production of 1-alkyl-piperidines which consists in reacting with a hydrohalic acid an N-alkyl-tetrahydrofurfurylamine in the proportion of at least two moles of the hydrohalic acid per mole of amine.

2. A step in the production of 1-alkyl-piperidines which consists in reacting with a hydrohalic acid an N-alkyl-tetrahydrofurfurylamine in the proportion of at least two moles of the hydrohalic acid per mole of amine, in the presence of acetic acid.

3. A step in the production of 1-alkyl-piperidines which consists in reacting with hydrobromic acid an N-alkyl-tetrahydrofurfurylamine in the proportion of at least two moles of the hydrobromic acid per mole of amine.

4. A step in the production of 1-alkyl-piperidines which consists in reacting with hydrobromic acid an N-alkyl-tetrahydrofurfurylamine in the proportion of at least two moles of the hydrobromic acid per mole of amine, in the presence of organic carboxylic acid.

5. A step in the production of 1-alkyl-piperidines which consists in reacting with hydrobromic acid an N-alkyl-tetrahydrofurfurylamine in the proportion of at least two moles of the hydrobromic acid per mole of amine, in the presence of acetic acid.

6. Process for the preparation of 1-alkyl-3-hydroxy-piperidines which process comprises reacting with a hydrohalic acid an N-alkyl-tetrahydrofurfurylamine in the proportion of at least two moles of the hydrohalic acid per mole of amine, neutralizing the reaction mixture and separating the 1-alkyl-3-hydroxy-piperidine therefrom.

7. Process for the preparation of 1-alkyl-3-hydroxy-piperidines which process comprises reacting with a hydrohalic acid an N-alkyl-tetrahydrofurfurylamine in the proportion of at least two moles of the hydrohalic acid per mole of amine, in the presence of organic carboxylic acid, neutralizing the reaction mixture and separating the 1-alkyl-3-hydroxy-piperidine therefrom.

8. Process for the preparation of 1-alkyl-3-hydroxy-piperidines which process comprises reacting with hydrobromic acid an N-alkyl-tetrahydrofurfurylamine in the proportion of at least two moles of the hydrobromic acid per mole of amine, in the presence of acetic acid, neutralizing the reaction mixture and separating the 1-alkyl-3-hydroxy-piperidine therefrom.

9. Process for the preparation of 1-alkyl-3-hydroxy-piperidines which process comprises neutralizing a hydrohalide of an N-alkyl-1-amino-2-hydroxy-5-halogeno-pentane.

10. Process for the preparation of 1-alkyl-3-hydroxy-piperidines which process comprises neutralizing a hydrobromide of an N-alkyl-1-amino-2-hydroxy-5-bromo-pentane.

11. Process for the preparation of 1-alkyl-3-hydroxy-piperidines which process comprises neutralizing a hydrohalide of an N-alkyl-1-amino-2-hydroxy-5-halogeno-pentane by the addition of ammonia.

12. Process for the preparation of 1-alkyl-3-hydroxy-piperidines which process comprises neutralizing a hydrobromide of an N-alkyl-1-amino-2-hydroxy-5-bromo-pentane by the addition of ammonia.

SERGE TCHELITCHEFF.

REFERENCES CITED

The following references are of record in the file of this patent:

UNITED STATES PATENTS

| Number | Name | Date |
|---|---|---|
| 2,192,840 | Perlog | Mar. 5, 1940 |
| 2,265,201 | Schmidt et al. | Dec. 9, 1941 |

FOREIGN PATENTS

| Number | Country | Date |
|---|---|---|
| 913,969 | France | June 11, 1946 |
| 53,859 | France | July 16, 1946 |
| | (Addition to No. 913,969) | |

OTHER REFERENCES

Granger, Ber der Deu Chem., vol. 28, p. 1203 (1895).

Gunther, Ber der Deu Chem., vol. 31, p. 2140 (1898).

Montmollin Helv. Chim. Acta., vol. 12, p. 605 (1929), complete article, pp. 604–609.

Paul et al., Compt. Rendu, vol. 221, pp. 412–414 (1945).

Paul, Compt. Rendu, vol. 221, pp. 560–562 (1945).